United States Patent
Tsukahara et al.

(10) Patent No.: US 9,934,805 B1
(45) Date of Patent: Apr. 3, 2018

(54) MAGNETIC DISK DEVICE AND WRITE METHOD

(71) Applicant: Kabushiki Kaisha Toshiba, Minato-ku, Tokyo (JP)

(72) Inventors: Wataru Tsukahara, Yokohama Kanagawa (JP); Shinichirou Kouhara, Hino Tokyo (JP); Takao Abe, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/691,822

(22) Filed: Aug. 31, 2017

(30) Foreign Application Priority Data

Mar. 7, 2017 (JP) .................................. 2017-043013

(51) Int. Cl.
*G11B 5/596* (2006.01)
*G11B 20/12* (2006.01)

(52) U.S. Cl.
CPC ...... *G11B 5/59627* (2013.01); *G11B 20/1217* (2013.01); *G11B 2020/1238* (2013.01); *G11B 2020/1292* (2013.01)

(58) Field of Classification Search
CPC ............. G11B 5/596–5/59611; G11B 5/59627
USPC ............................ 360/55, 60, 69, 75, 77.04
See application file for complete search history.

(56) References Cited

U.S. PATENT DOCUMENTS

| | | | | |
|---|---|---|---|---|
| 7,372,658 B2 * | 5/2008 | Takaishi | ............. | G11B 5/59627 360/77.04 |
| 7,372,659 B2 * | 5/2008 | Takaishi | ............. | G11B 5/59627 360/77.04 |
| 7,869,156 B2 * | 1/2011 | Takaishi | ............. | G11B 5/59627 360/77.04 |
| 7,903,366 B2 * | 3/2011 | Michinaga | ......... | G11B 5/59627 360/77.04 |
| 8,539,313 B2 * | 9/2013 | D'Abreu | ............. | G06F 11/1048 714/760 |
| 8,724,248 B2 * | 5/2014 | Dhanda | .............. | G11B 5/59627 360/75 |
| 9,349,400 B1 * | 5/2016 | Dhanda | .............. | G11B 5/59627 |
| 2011/0141600 A1 | 6/2011 | Ohtsubo et al. | | |
| 2012/0162806 A1 | 6/2012 | Champion et al. | | |
| 2015/0279395 A1 | 10/2015 | Kim et al. | | |
| 2015/0294690 A1 | 10/2015 | Kanamaru et al. | | |

(Continued)

FOREIGN PATENT DOCUMENTS

JP     2011-129178     6/2011
JP     4810603 B2     11/2011

*Primary Examiner* — Wayne Young
*Assistant Examiner* — James L Habermehl
(74) *Attorney, Agent, or Firm* — White & Case LLP

(57) ABSTRACT

According to one embodiment, a magnetic disk device including a disk, and a controller which calculates a first corrected value based on a first eccentricity of the disk, and writes a first track based on the first corrected value, wherein when the controller interrupts the process for writing the second track so as to overlap the first track at a first position, the controller measures a second eccentricity of the disk, and compares the first eccentricity with the second eccentricity, and when the first eccentricity is different from the second eccentricity, the controller restarts the process for writing the second track from a second position away from the first position in a radial direction.

20 Claims, 9 Drawing Sheets

(56) References Cited

U.S. PATENT DOCUMENTS

2016/0171996 A1\* 6/2016 Lee .................... G11B 5/59627
360/77.07

\* cited by examiner

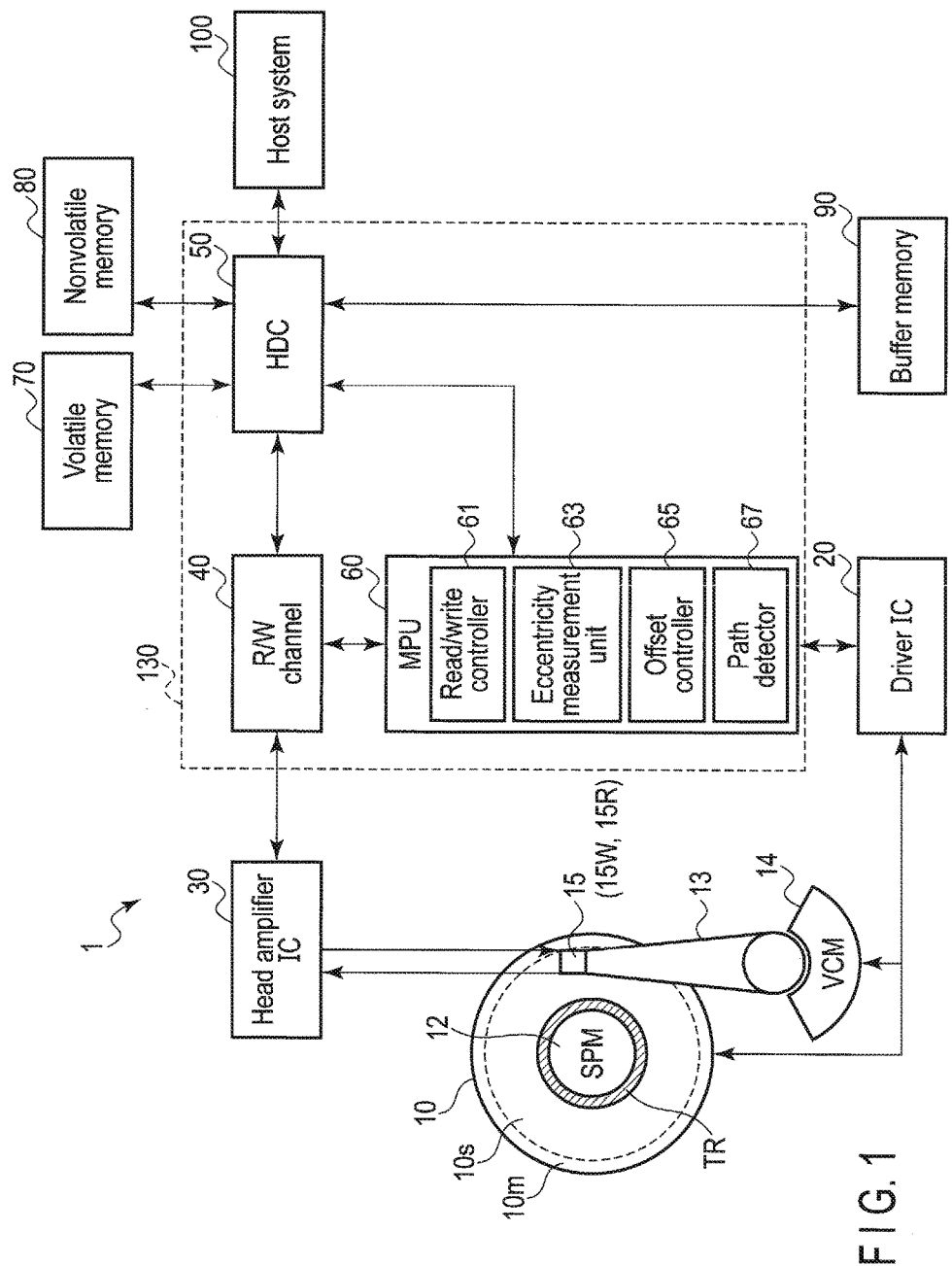
F I G. 1

2

MAGNETIC DISK DEVICE AND WRITE METHOD

CROSS-REFERENCE TO RELATED APPLICATIONS

This application is based upon and claims the benefit of priority from Japanese Patent Application No. 2017-043013, filed Mar. 7, 2017, the entire contents of which are incorporated herein by reference.

FIELD

Embodiments described herein relate generally to a magnetic disk device and a write method.

BACKGROUND

In recent years, various technologies have been developed to increase storage capacity in magnetic disk devices. In one of the technologies, magnetic disk devices use shingled magnetic recording (SMR) to write data. In shingled magnetic recording, magnetic disk devices write data to a disk such that the current track overlaps part of the previously written adjacent track (hereinafter, simply referred to as the adjacent track). When magnetic disk devices write data by shingled magnetic recording, the track density (tracks per inch: TPI) of disks can be improved in comparison with normal recording.

In magnetic disk devices, generally, disk eccentricity is generated due to, for example, an attachment error of a disk and a spindle motor. When disk eccentricity is generated, dynamic offset (DO) occurs. Specifically, when the disk makes one revolution, the read/write offset value changes within a single track. Thus, in magnetic disk devices, write dynamic offset control (WDOC) which adjusts the R/W offset value is performed in a write process to control the dynamic offset. When a magnetic disk device performs WDOC, the device measures the eccentricity, calculates a corrected value based on the measured eccentricity, and performs WDOC based on the calculated corrected value. The state of eccentricity of the disk may be changed by external impact, etc. When the state of eccentricity of the disk has been changed, the magnetic disk device measures the eccentricity again, calculates a corrected value based on the measured eccentricity, and performs WDOC based on the calculated corrected value.

In magnetic disk devices which employ shingled magnetic recording, when the corrected value differs between before and after the change of the state of eccentricity of the disk, the data written to the adjacent track might be erased.

BRIEF DESCRIPTION OF THE DRAWINGS

FIG. 1 is a block diagram showing the configuration of a magnetic disk device according to one embodiment.

DETAILED DESCRIPTION

Figure 2:
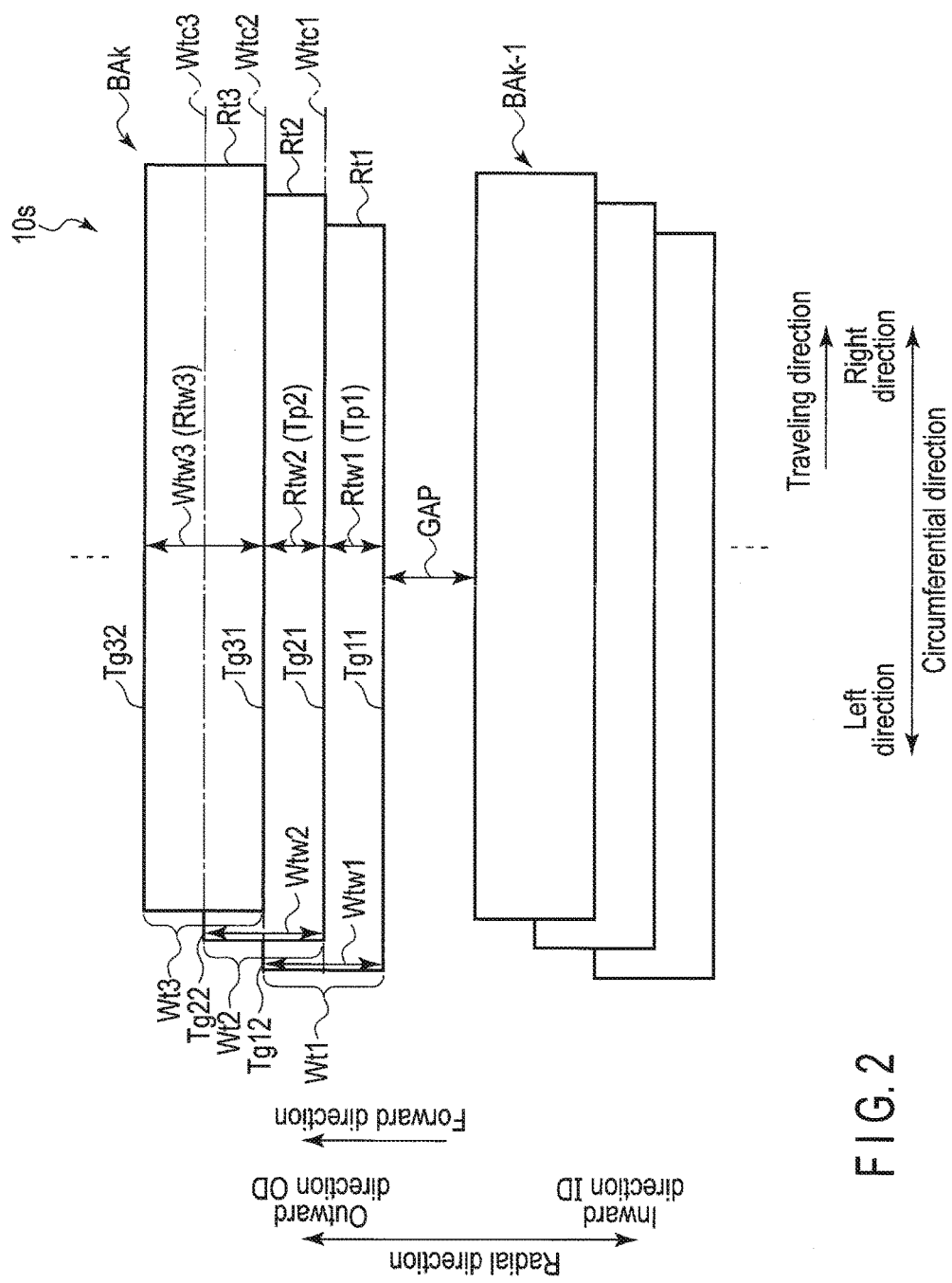
FIG. 2 is a schematic diagram showing an example of a shingled magnetic recording area to which data is written.

In general, according to one embodiment, a magnetic disk device comprises a disk; a head which writes data to the disk and reads data from the disk; and a controller which calculates a first corrected value based on a first eccentricity of the disk, writes a first track to a first target position based on the first corrected value, and writes a second track so as to overlap the first track to a second target position a first distance away from the first target position in a first direction according to a radial direction based on the first corrected value, wherein when the controller interrupts the process for writing the second track so as to overlap the first track at a first position of the second track, and restarts the process for writing the second track from the first position, the controller measures a second eccentricity of the disk, and compares the first eccentricity with the second eccentricity, and when the first eccentricity is different from the second eccentricity, the controller restarts the process for writing the second track from a second position a second distance away from the first position in the first direction.

An embodiment will be described hereinafter with reference to the accompanying drawings. The drawings are merely examples, and in no way restrict the scope of the invention.

(Embodiment)

FIG. 1 is a block diagram showing the configuration of a magnetic disk device 1 according to an embodiment.

The magnetic disk device 1 comprises a head-disk assembly (HDA) as described later, a driver IC 20, a head amplifier integrated circuit (IC) 30, a volatile memory 70, a nonvolatile memory 80, a buffer memory (buffer) 90, and a system controller 130 which is a single-chip integrated circuit. The magnetic disk device 1 is connected to a host system (host) 100.

The HDA comprises a magnetic disk (disk) 10, a spindle motor (SPM) 12, an arm 13 comprising a head 15, and a voice coil motor (VCM) 14. The disk 10 is rotatably attached to the SPM 12. The arm 13 and the VCM 14 form an actuator. The number of disks 10 and the number of heads 15 may be two or more.

In the disk 10, a shingled magnetic recording (SMR) area 10s and a media cache area 10m are allocated to a data area. For example, user data as a write request from the host 100 is recorded in the shingled magnetic recording area 10s. The media cache area 10m may be used as a cache of the shingled magnetic recording area 10s. The shingled magnetic recording area 10s is a recording area in which each track is written so as to partially overlap the previous track. Since a plurality of tracks overlap each other in this manner, the track density (tracks per inch: TPI) of the shingled magnetic recording area 10s is higher than that of a normal recording area in which the tracks do not overlap each other. In the shingled magnetic recording area 10s, a group of overlapping tracks is called a band area. The shingled magnetic recording area 10s may include a plurality of band areas. Each band area includes at least one track (shingled magnetic recording track) overlapping part of an adjacent track, and a track (final track) written last. No track is written to overlap the final track. Thus, the track width of the final track is greater than that of each shingled magnetic recording track. In each band area, each track written to the disk 10 is called a write track. In each band area, the area of each write track excluding the overlapping area is called a read track. The term "track" may be used as a term including a write track and a read track. The track width of a write track may be referred to as a write track width. The track width of a read track may be referred to as a read track width.

The shingled magnetic recording area 10s comprises a test region TR. In the example shown in FIG. 1, the shingled magnetic recording area 10s comprises the test region TR on the internal side. The shingled magnetic recording area 10s may comprise the test region TR in an area other than the internal side.

FIG. 2 is a schematic diagram showing an example of the shingled magnetic recording area 10s to which data is written. In FIG. 2, the horizontal axis is the circumferential direction of the disk 10. The vertical axis is the radial direction of the disk 10 perpendicular to the circumferential direction. The circumferential direction is a direction parallel to the rotational direction of the disk 10. The circumferential direction includes a right direction and a left direction opposite to the right direction. In the circumferential direction, the direction in which data is written is referred to as a traveling direction. For example, the traveling direction is opposite to the rotational direction. In FIG. 2, the traveling direction is the same as the right direction. The traveling direction may be the same as the left direction. The radial direction includes an outward direction (external side) OD from the inner circumference to outer circumference of the disk 10, and an inward direction (internal side) ID opposite to the outward direction OD. In the radial direction, the direction in which data is written is called a forward direction. In FIG. 2, the forward direction is the same as the outward direction OD. The forward direction may be the same as the inward direction ID.

FIG. 2 shows band areas BAk and BAk−1 written to the shingled magnetic recording area 10s. For the sake of convenience, FIG. 2 shows each track by straight lines extending in the circumferential direction with a track width. However, the actual tracks are formed by curves in the circumferential direction. In band areas BAk and BAk−1, each track is provided along the whole circumference of the disk 10 such that the leftward end coincides with the rightward end in the circumferential direction. In FIG. 2, for example, the misalignment of tracks generated by disturbance or other structural effects is adjusted. FIG. 2 shows two band areas, specifically, band areas BAk and BAk−1.

Band area BAk is adjacent to band area BAk−1 in the radial direction. A gap (or a guard area; GAP) is defined between band areas BAk and BAk−1 to prevent overwriting, etc. The track structure of band area BAk is substantially the same as that of band area BAk−1. In the following description, the track structure of band area BAk is explained. However, the explanation of the track structure of band area BAk is also applied to that of band area BAk−1.

In the example shown in FIG. 2, write tracks Wt1, Wt2 and Wt3 are written in series so as to overlap each other in the radial direction in band area BAk. Although not shown in FIG. 2, each of write tracks Wt1, Wt2 and Wt3 includes a plurality of sectors. In the example, band area BAk includes three tracks. However, band area BAk should include at least one track.

Write track Wt1 comprises track edges Tg11 and Tg12. In the example shown in FIG. 2, track edge Tg11 is the end of write track Wt1 in the direction (internal side ID) opposite to the forward direction. Track edge Tg12 is the end of write track Wt2 in the forward direction (external side OD). Write track Wt2 comprises track edges Tg21 and Tg22. In the example shown in FIG. 2, track edge Tg21 is the end of write track Wt2 in the direction (internal side ID) opposite to the forward direction. Track edge Tg22 is the end of write track Wt2 in the forward direction (external side OD). Write track Wt3 comprises track edges Tg31 and Tg32. In the example shown in FIG. 2, track edge Tg31 is the end of write track Wt3 in the direction (internal side ID) opposite to the forward direction. Track edge Tg32 is the end of write track Wt2 in the forward direction (external side OD).

In FIG. 2, write track width Wtw1 is the distance between track edges Tg11 and Tg12 of write track Wt1 in the radial direction. Write track width Wtw2 is the distance between track edges Tg21 and Tg22 in the radial direction. Write track width Wtw3 is the distance between track edges Tg31 and Tg32 in the radial direction. FIG. 2 also shows track center Wtc1 of write track Wt1, track center Wtc2 of write track Wt2, and track center Wtc3 of write track Wt3. Track centers Wtc1, Wtc2 and Wtc3 are the target positions in the radial direction for the positional determination of the head 15 (write head 15W) in write tracks Wt1, Wt2 and Wt3, respectively (hereinafter, simply referred to as target positions). In the example shown in FIG. 2, track centers Wtc1, Wtc2 and Wtc3 are equivalent to the centers of the write track widths of write tracks Wt1, Wt2 and Wt3, respectively. Track centers Wtc1, Wtc2 and Wt3 are provided at regular intervals in the radial direction. In the example shown in FIG. 2, track centers Wtc1, Wtc2 and Wtc3 are shown by straight lines in the circumferential direction. However, the actual track centers Wtc1, Wtc2 and Wtc3 are formed by curves in the circumferential direction of the disk 10. Track centers Wtc1, Wtc2 and Wtc3 are, for example, circular paths on the disk 10 based on the pivot point of the actuator.

Read track Rt1 is an area of write track Wt1 excluding the part overwritten with write track Wt2 in the forward direction. Read track Rt2 is an area of write track Wt2 excluding the part overwritten with write track Wt3 in the forward direction. In FIG. 2, read track Rt3 corresponds to write track Wt3. In the example shown in FIG. 2, read tracks Rt1 and Rt2 correspond to shingled magnetic recording tracks. Read track Rt3 corresponds to a final track.

In FIG. 2, read track width Rtw1 is the distance between track edges Tg11 and Tg21. Read track width Rtw2 is the distance between track edges Tg21 and Tg31. In FIG. 2, read track width Rtw3 corresponds to write track width Wtw3. In FIG. 2, read track widths Rtw1, Rtw2 and Rtw3 are constant in the circumferential direction. Read track widths Rtw1 and Rtw2 are the same width. Read track widths Rtw1 and Rtw2 are less than read track width Rtw3.

In the case of normal writing, the track pitch (first distance) indicates the distance between track centers in the radial direction. In the case of shingled magnetic recording, the track pitch (first distance) indicates the distance between track edges. Thus, track pitch Tp1 between read tracks Rt1 and Rt2 is equivalent to read track width Rtw1. Similarly, track pitch Tp2 between read tracks Rt2 and Rt3 is equivalent to read track width Rtw2.

The head 15 comprises a slider as a main unit, a write head 15W mounted on the slider, and a read head 15R. The read head 15R reads data written to the data tracks on the disk 10. The write head 15W writes data onto the disk 10.

The driver IC 20 controls the driving of the SPM 12 and the VCM 14 in accordance with the control of the system controller 130 (specifically, an MPU 60 as described later). The driver IC 20 moves the head 15 mounted on the arm 13 to the target radial position on the disk 10 by controlling the driving of the actuator (VCM 14). The driver IC 20 rotates the disk 10 by controlling the driving of the SPM 12.

In the head 15, the read head 15R and the write head 15W are separately provided across an intervening space. Thus, offset (misalignment) occurs between the position of the read head 15R in the radial direction and the target position of the write head 15 in accordance with the radial position of the head 15. This offset is called read/write (R/W) offset.

Figure 3A:
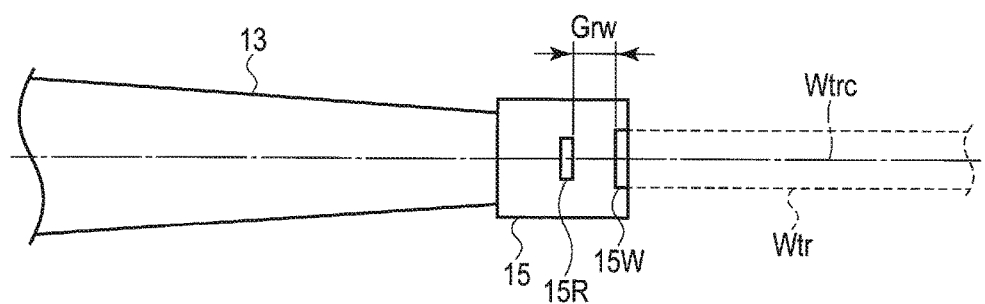
FIG. 3A is a schematic diagram showing an example of the state of a head when R/W offset does not occur.
Figure 3B:
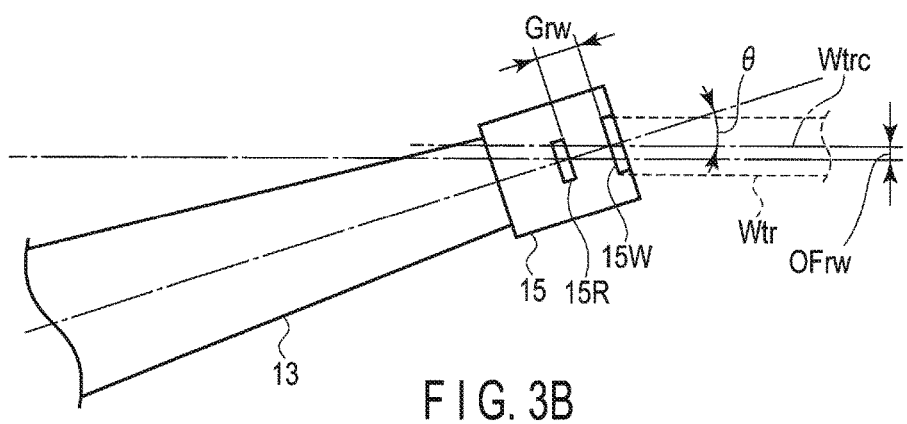
FIG. 3B is a schematic diagram showing an example of the state of the head when R/W offset occurs.

FIG. 3A is a schematic diagram showing an example of the state of the head 15 when R/W offset does not occur. FIG. 3B is a schematic diagram showing an example of the state of the head 15 when R/W offset occurs. In FIG. 3A and FIG. 3B, write track Wtr is written onto the disk 10 by following the target position (track center) Wtrc with the center of the write head 15W. Track center Wtrc is, for example, a circular path on the disk 10 based on the pivot point of the actuator. As shown in FIG. 3A and FIG. 3B, the read head 15R and the write head 15W are separately provided across an intervening R/W gap Grw.

As shown in FIG. 3A, when the head 15 is located horizontally with respect to track center Wtrc, R/W offset (misalignment) does not substantially occur between the central path of the read head 15R and the central path of the write head 15W.

As shown in FIG. 3B, when the head 15 is inclined at a skew angle (azimuth angle) θ with respect to track center Wtrc of write track Wrt, an R/W offset value OFrw is generated between the central path of the read head 15R and the central path of the write head 15W. In the example shown in FIG. 3B, the R/W offset value OFrw is shown by OFrw=Grw×sin θ. In the example shown in FIG. 3B, the effect caused by disk eccentricity described later is not taken into consideration. Thus, the R/W offset value OFrw is constant in each track. The skew angle θ indicates the angle between the tangent to the track arc and the line connecting the pivot point of the actuator and the central point of the head 15. The skew angle θ is determined by the position of the head 15, the rotational center of the SPM 12 and the pivot point of the actuator. The skew angle θ changes based on the track position (cylinder position) for performing read operation or write operation, in other words, the position on the disk 10 in the radial direction (hereinafter, referred to as a radial position). In the manufacturing process, the magnetic disk device 1 may detect the R/W offset value OFrw for each track of the disk 10, and hold the values in a memory, for example, the nonvolatile memory 80. In the manufacturing process, the magnetic disk device 1 may hold parameters for calculating the R/W offset value OFrw in a memory, for example, the nonvolatile memory 80. The parameters are, for example, the skew angle θ at each position on the disk 10 and the R/W gap Grw.

The head amplifier IC 30 comprises a read amplifier and a write driver. The read amplifier amplifies a read signal read from the disk 10, and outputs the signal to the system controller 130 (specifically, a read/write [R/W] channel 40 as described later). The write driver outputs write current to the head 15 in accordance with the write data output from the R/W channel 40.

The volatile memory 70 is a semiconductor memory in which the stored data is lost when power supply is stopped. The volatile memory 70 stores, for example, data necessary for the process of each unit of the magnetic disk device 1. The volatile memory 70 is, for example, a dynamic random access memory (DRAM) or a synchronous dynamic random access memory (SDRAM).

The nonvolatile memory 80 is a semiconductor memory in which the stored data is maintained even when power supply is stopped. The nonvolatile memory 80 is, for example, a NOR or NAND flash read only memory (FROM).

The buffer memory 90 is a semiconductor memory which temporarily records, for example, data transferred between the magnetic disk device 1 and the host 100. The buffer memory 90 may be integrally formed with the volatile memory 70. The buffer memory 90 is, for example, a dynamic random access memory (DRAM), a static random access memory (SRAM), an SDRAM, a ferroelectric random access memory (FeRAM) or a magnetoresistive random access memory (MRAM).

For example, the system controller (controller) 130 is realized by using a large-scale integration (LSI) circuit called a system-on-a-chip (SoC) in which a plurality of elements are integrated into a single chip. The system controller 130 includes the read/write (R/W) channel 40, a hard disk controller (HDC) 50, and a microprocessor (MPU) 60.

The R/W channel 40 performs the signal process of read data and write data. The R/W channel 40 comprises a circuit or function for measuring the signal quality of read data. The HDC 50 controls data transfer between the host 100 and the R/W channel 40 in accordance with an instruction from the MPU 60 explained later.

The MPU 60 is a main controller which controls each unit of the magnetic disk device 1. The MPU 60 controls the VCM 14 through the driver IC 20, and performs servo control for determining the position of the head 15. The MPU 60 controls the operation for writing data to the disk 10, and selects the storage destination of write data transmitted from the host 100.

The MPU 60 includes a read/write controller 61, an eccentricity measurement unit 63, an offset controller 65 and a path detector 67. The MPU 60 may perform the processes of these units on firmware.

The read/write controller 61 controls the read process and write process of data in accordance with a command from the host 100. The read/write controller 61 controls the VCM 14 through the driver IC 20, positions the head 15 at the target position on the disk 10, and performs a read process or a write process. For example, when a write process is performed, the read/write controller 61 performs shingled magnetic recording by setting the track center of each track as the target position.

Figure 4:
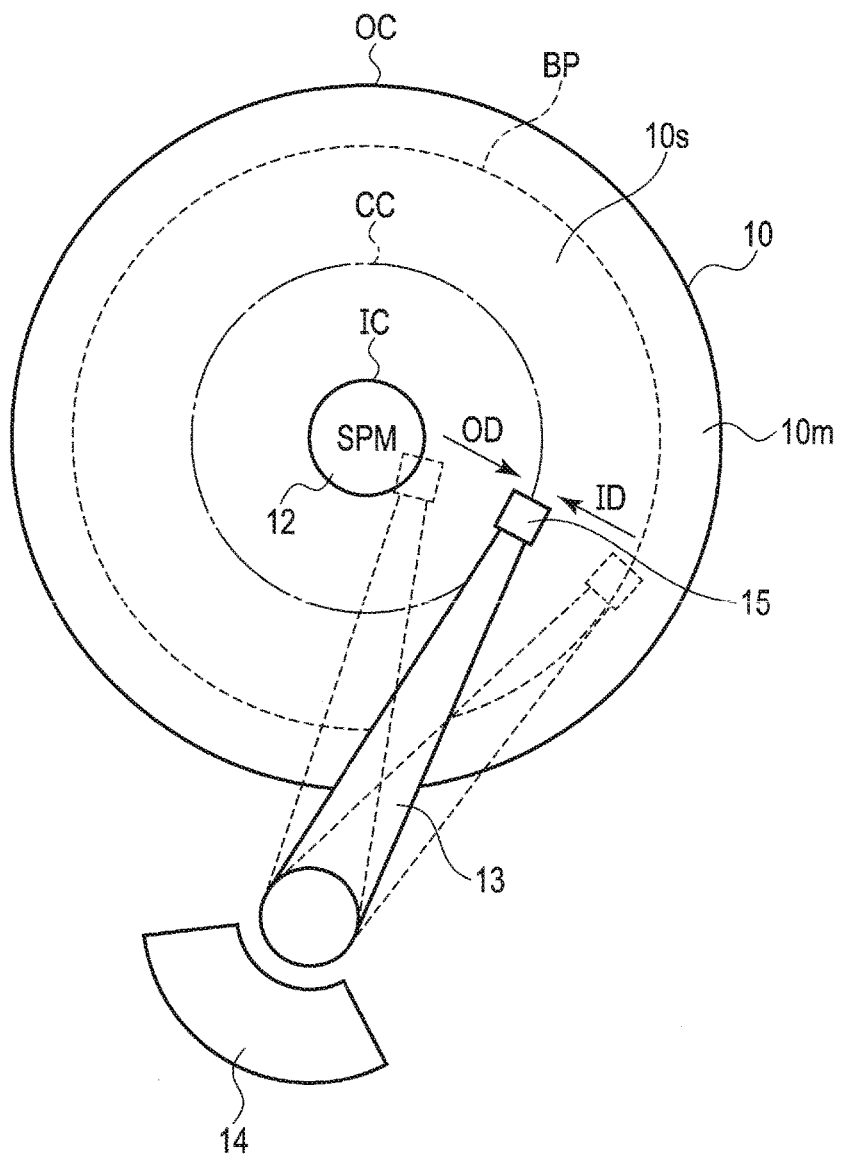
FIG. 4 is a schematic diagram showing an example of control of a process for writing data.

FIG. 4 is a schematic diagram showing an example of control of a process for writing data. FIG. 4 shows the inner circumference IC of the disk 10 in the radial direction, a switching position CC, a boundary position BP between the media cache area 10m and the shingled magnetic recording area 10s, and the outer circumference OC of the disk 10 in the radial direction. FIG. 4 also shows the outward direction OD from the inner circumference IC to the outer circumference OC, and the inward direction ID from the outer circumference OC to the inner circumference IC. The switching position CC is a position for switching the direction (forward direction) in which data is written in the radial direction. The switching position CC is located between the inner circumference IC and the boundary position BP. For example, the switching position CC is a position in the radial direction at which the skew angle of the head 15 is substantially zero on the disk 10. The switching position CC may be set to a different position depending on the head, disk or magnetic disk device.

The read/write controller 61 writes data by switching the forward direction to the outward direction OD or the inward direction ID. For example, the read/write controller 61 performs shingled magnetic recording for data from the inner circumference IC to the switching position CC in the outward direction OD. Subsequently, the read/write controller 61 performs shingled magnetic recording for data from the boundary position BP to the switching position CC in the inward direction ID. Alternatively, the read/write controller 61 may perform shingled magnetic recording for data from the boundary position BP to the switching position CC in the inward direction ID, and then perform shingled magnetic recording for data from the inner circumference IC to the switching position CC in the outward direction OD. In the above explanation, the read/write controller 61 switches the forward direction at the switching position CC to the outward direction OD or the inward direction ID. However, the read/write controller 61 may not switch the forward direction. For example, the read/write controller 61 may perform shingled magnetic recording for data by fixing the forward direction to one of the inward and outward directions ID and OD. The read/write controller 61 may perform a normal write process which is not shingled magnetic recording.

Disk eccentricity may be generated due to, for example, the attachment error of the disk 10 and the SPM 12 in the process for manufacturing the magnetic disk device 1. When disk eccentricity is generated, dynamic offset (DO) occurs. Specifically, when the disk makes one revolution, the R/W offset value changes within a single track. To control dynamic offset (OD), the read/write controller 61 performs write dynamic offset control (WDOC) for adjusting the R/W offset value in a write process in accordance with the offset controller described later. To appropriately perform WDOC, the eccentricity of the disk 10 needs to be measured with high accuracy.

The eccentricity measurement unit 63 measures the eccentricity of the disk 10, calculates the corrected value of the dynamic offset based on the measured eccentricity of the disk 10 (hereinafter, simply referred as a corrected value), and writes the measured eccentricity and the calculated corrected value to the disk 10 and a memory, for example, the nonvolatile memory 80. For example, the eccentricity measurement unit 63 may read each track of the disk 10, calculate the eccentricity from current corresponding to the data read from the track, and calculate a corrected value based on the calculated eccentricity. The eccentricity measurement unit 63 may calculate the eccentricity by pressing the head 15 onto the inner circumference and reading servo data written to the disk 10, and calculate a corrected value from the calculated eccentricity. In the manufacturing process, the eccentricity measurement unit 63 measures the eccentricity of the disk 10, calculates a corrected value from the measured eccentricity, and writes the measured eccentricity and the calculated corrected value to the disk 10, a memory, etc. The corrected value measured in the manufacturing process may be called a default value.

In the magnetic disk device 1, the state of eccentricity of the disk 10, for example, the state of the first eccentricity, may be changed. For example, disk shift may occur in the magnetic disk device 1. Specifically, the center of the disk may be shifted by external impact when the device is turned off after the device is shipped out. When the state of eccentricity of the disk 10 is changed, the eccentricity subsequent to the change in the state of eccentricity of the disk 10 may be different from the eccentricity before the change in the state of eccentricity of the disk 10. Thus, the eccentricity measurement unit 63 measures the eccentricity of the disk 10 at a time point, for example, at the time of activating the magnetic disk device (hereinafter, referred to as the current eccentricity), and compares the measured current eccentricity with the eccentricity previously measured (hereinafter, referred to as the previous eccentricity). When the current eccentricity is different from the previous eccentricity, the eccentricity measurement unit 63 calculates the current corrected value based on the current eccentricity, writes the current eccentricity to a memory, and changes the corrected value to be used in WDOC from the previous corrected value to the current corrected value. The eccentricity measurement unit 63 sets a flag indicating that the corrected value to be used in WDOC has been changed (hereinafter, referred to as a change flag [first flag]), and a flag indicating that the path of the track (data) written in accordance with WDOC based on the changed corrected value has not been confirmed (hereinafter, referred to as an unconfirmed flag [second flag]). When the current eccentricity is the same as the previous eccentricity, or when the difference is within an acceptable range, the eccentricity measurement unit 63 does not change the previous corrected value as the corrected value to be used in WDOC.

The offset controller 65 performs a write process in accordance with WDOC based on the corrected value through the read/write controller 61. The offset controller 65 determines whether or not a change flag is set when a write process is restarted from a middle position of, in other words, a middle sector (hereinafter, referred to as a restart sector) of a track in a band area to which some tracks are written. When the offset controller 65 determines that a change flag is not set, the offset controller 65 performs a write process in accordance with WDOC based on the previous corrected value through the read/write controller 61. When the offset controller 65 determines that a change flag is set, the offset controller 65 determines whether or not an unconfirmed flag is set. When the offset controller 65 determines that an unconfirmed flag is not set, the offset controller 65 restarts a write process in accordance with WDOC based on the current corrected value from a position (shift position) a certain distance away from the target position of the target track in the forward direction. For example, the DOC 65 restarts a write process from a shift position away from the target position of the target track in the forward direction by one track pitch or one track. When the offset controller 65 determines that an unconfirmed flag is set, the offset controller 65 performs a write process in accordance with WDOC based on the result of detection of the path of the track in the path detector 67 described later through the read/write controller 61. When the offset controller 65 determines that a change flag is set, the offset controller 65 may perform a write process in accordance with WDOC based on the current corrected value from a shift position a certain distance away from the target position of the target track in the forward direction without determining whether or not an unconfirmed flag is set.

Figure 5:
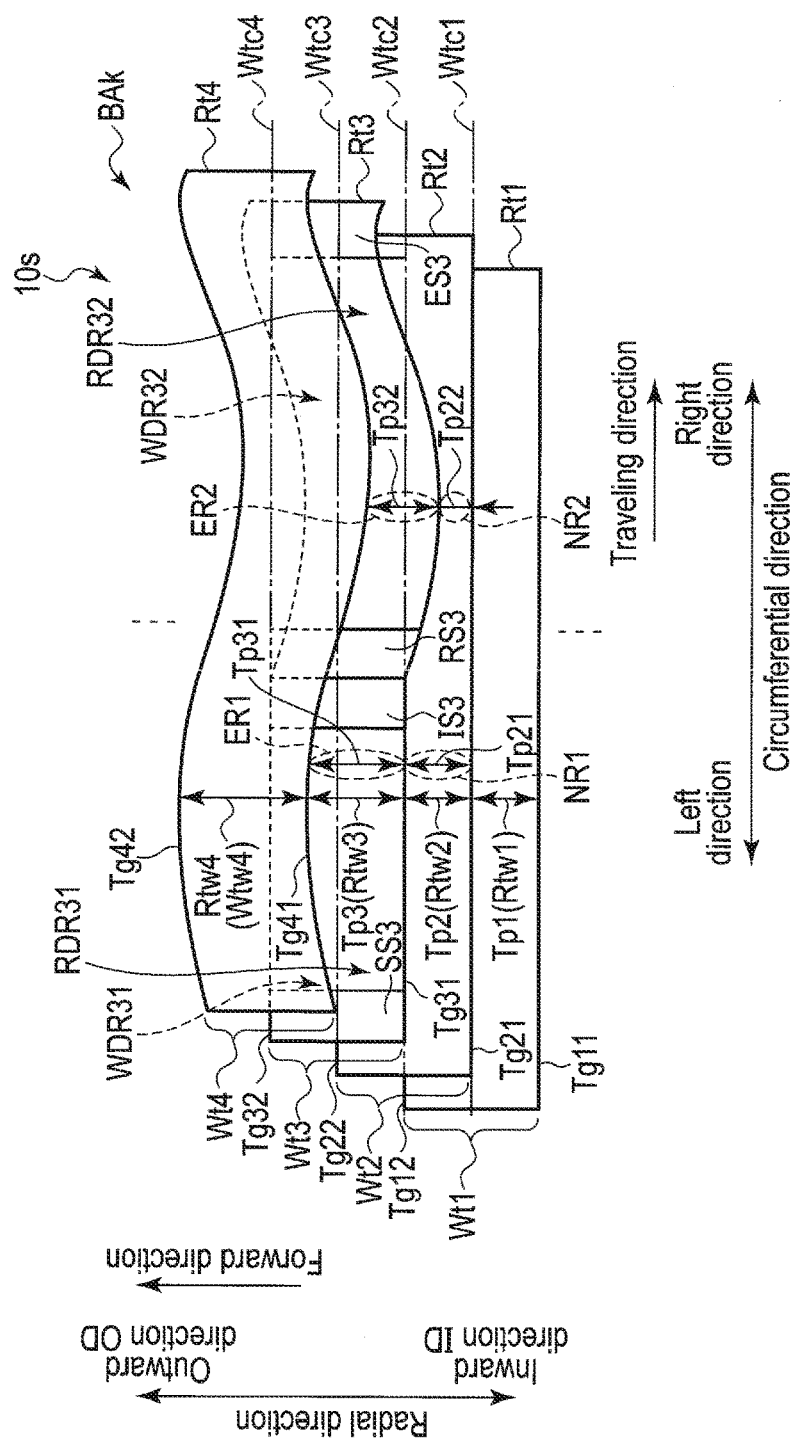
FIG. 5 shows an example of a write process which is restarted from a middle position of a track in a band area.

FIG. 5 shows an example of a write process restarted from a middle position of a track in a band area. In FIG. 5, explanation of the same structures as those of FIG. 2 is omitted. Structures different from those of FIG. 2 are explained below.

In the example shown in FIG. 5, write tracks Wt1, Wt2, Wt3 and Wt4 are written in series so as to partially overlap each other in the forward direction in band area BAk. FIG.

5 shows sector (start sector) SS3 in which a write process is started in write track Wt3, sector (interruption sector) IS3 in which the write process is interrupted, restart sector RS3 in which the write process is restarted, and sector (end sector) ES3 in which the write process ends in write track Wt3. Write track Wt3 includes write data region WDR31 from start sector SS3 to interruption sector IS3, and write data region WDR2 from restart sector RS3 to end sector ES3.

Write track Wt4 comprises track edges Tg41 and Tg42. In the example shown in FIG. 5, track edge Tg41 is the end of write track Wt4 in a direction (inward direction ID) opposite to the forward direction. Track edge Tg42 is the end of write track Wt4 in the forward direction (outward direction OD). Write track width Wtw4 is the distance between track edges Tg41 and Tg42 of write track Wt4 in the radial direction. FIG. 5 shows track center Wtc4 of write track Wt4. Track center Wtc4 is the target position of write track Wt4. In FIG. 5, track centers Wtc1, Wtc2, Wtc3 and Wtc4 are provided at regular intervals in the radial direction. In the example shown in FIG. 5, track center Wtc4 is indicated by a straight line in the circumferential direction. However, the actual track center Wtc4 is formed by a curve in the circumferential direction of the disk 10. Track center Wtc4 is, for example, a circular path on the disk 10 based on the pivot point of the actuator.

In the example shown in FIG. 5, read track Rt3 is an area of write track Wt3 excluding the part overwritten with write track Wt4. Read track Rt3 includes read data region RDR31 corresponding to write data region WDR31, and read data region RDR32 corresponding to write data region WDR32. Read track Rt2 includes region NR1 located in a direction opposite to the forward direction of read data region RDR31, and region NR2 located in a direction opposite to the forward direction of read data region RDR32. Read data region RDR32 includes region ER1 located in the forward direction of region NR1, and region ER2 located in the forward direction of region NR2. In region ER1, track edge Tg31 is substantially parallel to track edge Tg21 of the adjacent read track in a direction opposite to the forward direction (hereinafter, referred to as the previous adjacent read track). Area ER2 projects to part of the previous adjacent read track (region NR2). In FIG. 5, read track Rt4 corresponds to write track Wt4. In the example shown in FIG. 5, read tracks Rt1, Rt2 and Rt3 correspond to shingled magnetic recording tracks. Read track Rt4 corresponds to a final track.

In FIG. 5, read track width Rtw3 is the distance between track edges Tg31 and Tg41. Read track width Rtw4 is equivalent to write track width Wtw4. In FIG. 5, read track widths Rtw1, Rtw2 and Rtw3 change in the circumferential direction. Read track width Rtw4 is constant in the circumferential direction. Read track widths Rtw1, Rtw2, Rtw3 and Rtw4 are different from each other.

Track pitch Tp3 between read tracks Rt3 and Rt4 is equivalent to read track width Rtw3. In FIG. 5, track pitch Tp2 is constant in region NR1 and changes in region NR2 in the circumferential direction. Track pitch Tp2 includes track pitch Tp21 of region NR1, and track pitch Tp22 of region NR2. Track pitch Tp3 changes in the circumferential direction. Track pitch Tp3 includes track pitch Tp31 of region ER1, and track pitch Tp32 of region ER2. Track pitches Tp31 and Tp32 are different from each other.

For example, the offset controller 65 performs a write process for write track Wt1, write track Wt2 and write data region WDR31 in series in the forward direction in accordance with WDOC based on the corrected value (previous corrected value), and interrupts the write process at a position, for example, interruption sector IS3. When the state of eccentricity of the disk 10 is changed in the magnetic disk device 1 by external impact, etc., the eccentricity measurement unit 63 calculates the current corrected value, and changes the corrected value to be used in WDOC from the previous corrected value to the current corrected value. The offset controller 65 restarts the write process from restart sector RS3, and performs a write process for write data region WDR32 and write track Wt4 in series in the forward direction in accordance with WDOC based on the current corrected value.

When the accuracy of the current corrected value calculated in the eccentricity measurement unit 63 is insufficient, as shown in FIG. 5, the area in which a write process is performed in accordance with WDOC based on the previous corrected value changes in a manner different from that of the area in which a write process is performed in accordance with WDOC based on the current corrected value. Thus, when the offset controller 65 performs a write process in accordance with WDOC based on the current corrected value, the offset controller 65 may partially erase the adjacent write track (hereinafter, referred to as the previous adjacent write track) in a direction opposite to the forward direction in which a write process is performed in accordance with WDOC based on the previous corrected value. In the example shown in FIG. 5, region ER2 of read track Rt3 projects to region NR2 of read track Rt2. Thus, track pitch Tp22 of region NR2 is less than track pitch Tp21 of region NR1. In the present embodiment, when the offset controller 65 confirms that a change flag is set, and an unconfirmed flag is not set, the offset controller 65 performs a write process from a shift position a certain distance away from the target position of the target track in the forward direction in accordance with WDOC based on the current corrected value.

Figure 6:
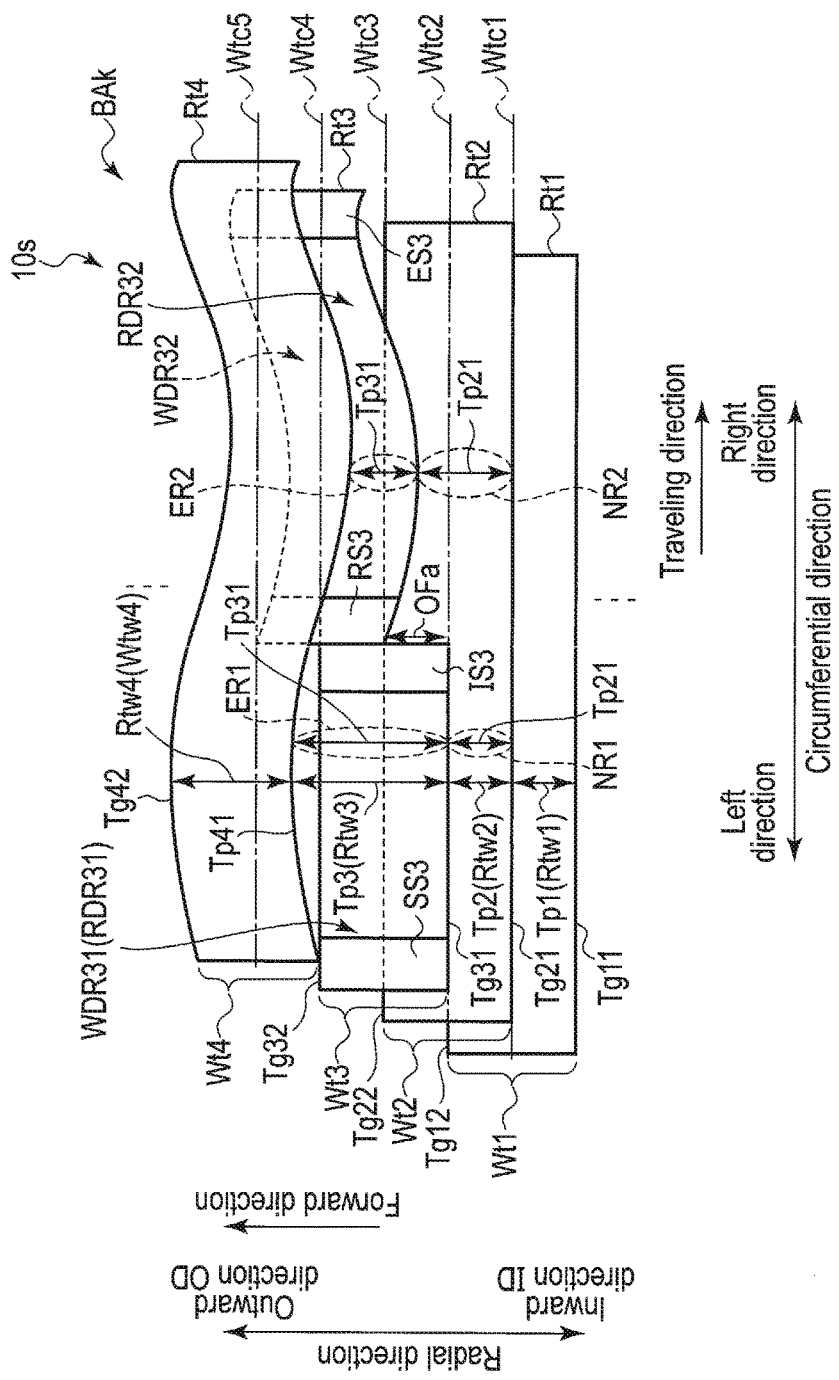
FIG. 6 shows an example of a write process which is restarted from a middle position of a track in a band area according to the embodiment.

FIG. 6 shows an example of a write process restarted from a middle position of a track in a band area according to the present embodiment. In FIG. 6, explanation of the same structures as those of FIG. 5 is omitted. Structures different from those of FIG. 5 are explained below. FIG. 6 shows track center Wtc5. In FIG. 6, track centers Wtc1, Wtc2, Wtc3, Wtc4 and Wtc5 are provided at regular intervals in the radial direction.

The offset controller 65 performs a write process for write track Wt1, write track Wt2 and write track Wt3 in series in the forward direction in accordance with WDOC based on the corrected value (previous corrected value), and interrupts the write process at a position (first position). When the write process is restarted from the position (first position), and further when the offset controller 65 confirms that a change flag is set, and an unconfirmed flag is not set, the offset controller 65 restarts the write process from a shift position (second position) away from the target position corresponding to the first position by an offset amount (second distance) OFa in the forward direction in accordance with WDOC based on the current corrected value.

In the example shown in FIG. 6, the offset controller 65 restarts the write process from restart sector RS3 on track center Wtc4 away from interruption sector IS3 on track center Wtc3 which is the target position of write track Wt3 by an offset amount OFa, for example, by one track pitch, in the forward direction. The offset controller 65 performs a write process from write data region WDR32 on track center Wtc4 to write track Wt4 on track center Wtc5 in series in the forward direction in accordance with WDOC based on the current corrected value. In this case, the offset controller 65 writes write track Wt4 so as to overlap write data region WDR32, setting the target position to track center Wtc5 away from track center Wtc4 which is the target position of restart sector RS3 by one track pitch in the forward direction. The offset amount OFa may be less than one track pitch, or may be greater than one track pitch.

The path detector 67 detects the path of the write track (data) written in accordance with WDOC based on the corrected value at a time point. When the path detector 67 detects that the path of the write track erases the previous adjacent write track, the path detector 67 leaves the change flag and the unconfirmed flag as they are. When the path detector 67 detects that the path of the write track erases the previous adjacent write track, the path detector 67 performs control such that the write process is restarted from a shift position a certain distance away from the interrupted position in the forward direction. When the path detector 67 detects that the path of the write track does not erase the previous adjacent write track, the path detector 67 erases the change flag and the unconfirmed flag. When the path detector 67 detects that the path of the write track does not erase the previous adjacent write track, the path detector 67 performs control such that the write process is restarted from the interrupted position in accordance with WDOC based on the current corrected value. In other words, when the path of a write track in accordance with WDOC based on the previous corrected value is substantially the same as the path of a write track in accordance with WDOC based on the current corrected value, specifically, when the accuracy of the calculated current corrected value is high, the path detector 67 performs control such that the write process is restarted from the interrupted position in accordance with WDOC based on the current corrected value. In this case, the position for restarting the write process is not shifted from the interrupted position in the forward direction. Thus, the band area can be maintained with a high density. Only when the previous corrected value is changed to the current corrected value, the path of the write track is detected at the time of activating the magnetic disk device 1. Thus, the activation time can be reduced in comparison with a case where the path of the write track is detected every time the magnetic disk device 1 is activated.

For example, the path detector 67 determines whether or not a change flag and an unconfirmed flag are set in an idle state. When the path detector 67 determines that a change flag and an unconfirmed flag are set, the path detector 67 writes, in accordance with WDOC based on the current corrected value, a write track so as to overlap the previous adjacent write track written in accordance with WDOC based on the previous corrected value in the test region TR of the disk 10. The path detector 67 reads the previous adjacent read track corresponding to the previous adjacent write track, and determines whether or not data can be normally read. When the path detector 67 determines that data cannot be normally read, the path detector 67 leaves the change flag and the unconfirmed flag as they are. When the path detector 67 determines that data can be normally read, the path detector 67 erases the change flag and the unconfirmed flag. When the change flag and unconfirmed flag are erased, the path detector 67 may erase the write track written in accordance with WDOC based on the previous corrected value from the test region TR, and write a write track written in accordance with WDOC based on the current corrected value.

Figure 7:
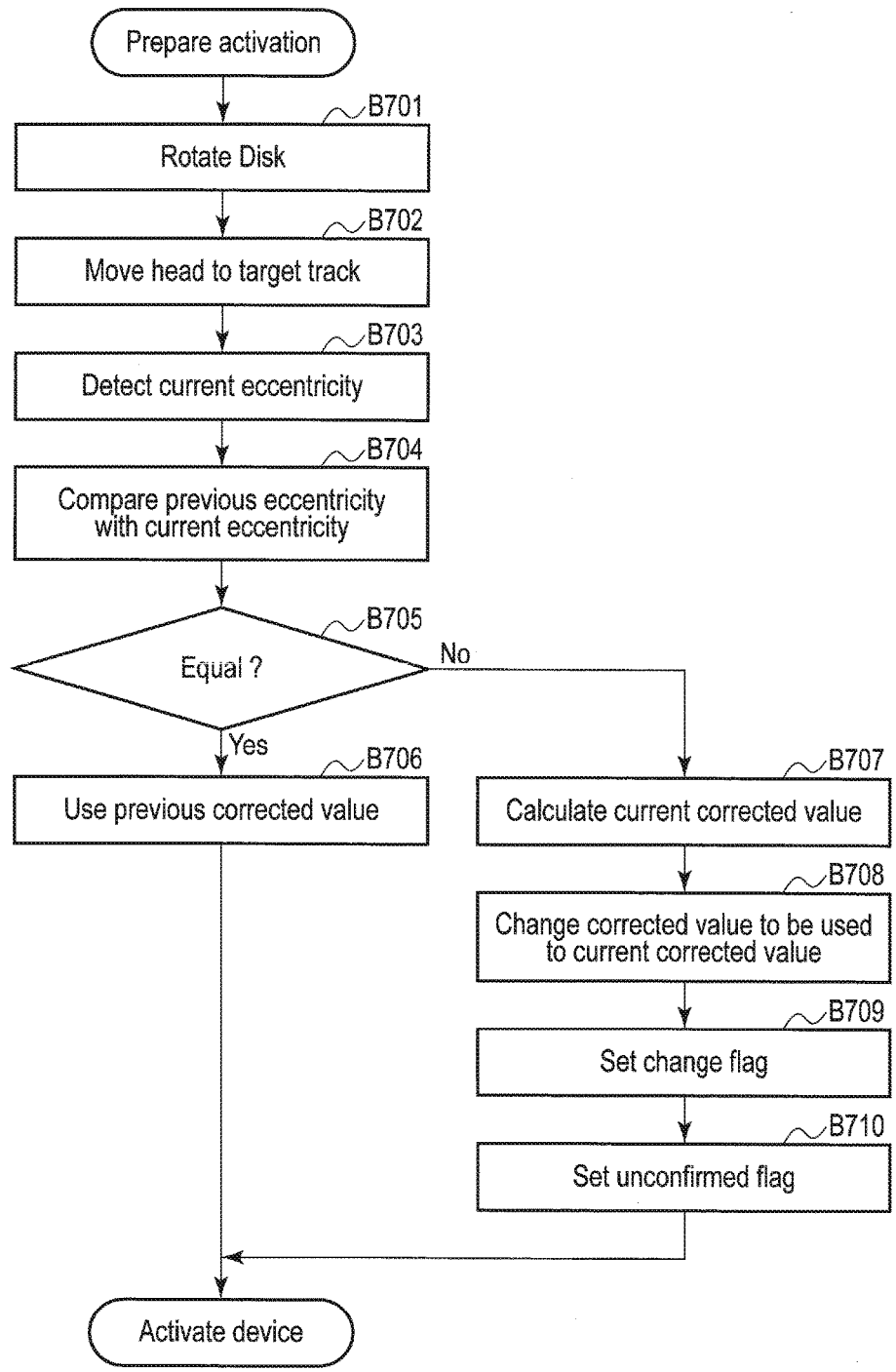
FIG. 7 is a flowchart showing an example of a process for measuring the eccentricity in the magnetic disk device according to the embodiment.

FIG. 7 is a flowchart showing an example of a process for measuring the eccentricity in the magnetic disk device 1 according to the present embodiment.

The MPU 60 rotates the disk 10 through the SPM 12 (B701), and moves the head 15 to the target track (B702).

The MPU 60 detects the current eccentricity on the target track to which the head 15 is moved (B703). For example, the MPU 60 measures the difference between the target position of the target track and the position of the head 15 (read head 15R) demodulated from the read servo data, and calculates the current eccentricity from the result of measurement. The MPU 60 may calculate the current eccentricity by reading the target track at the determined position and adjusting the read head 15R such that the first component of current corresponding to the read data is the least.

The MPU 60 compares the previous eccentricity with the current eccentricity (B704). The MPU 60 determines whether or not the previous eccentricity is equal to the current eccentricity (B705). When the MPU 60 determines that the previous eccentricity is equal to the current eccentricity (Yes in B705), the MPU 60 sets the previous corrected value so as to be used in WDOC (B706), and activates the magnetic disk device 1. The MPU 60 may be configured to determine that the previous eccentricity is equal to the current eccentricity either when the previous eccentricity is equal to the current eccentricity or when the difference is within an acceptable range.

When the MPU 60 determines that the previous eccentricity is different from the current eccentricity (No in B705), the MPU 60 calculates the current corrected value based on the current eccentricity (B707). The MPU 60 changes the corrected value to be used in WDOC from the previous corrected value to the current corrected value (B708). The MPU 60 sets a change flag (B709), sets an unconfirmed flag (B710), and activates the magnetic disk device 1.

Figure 8:
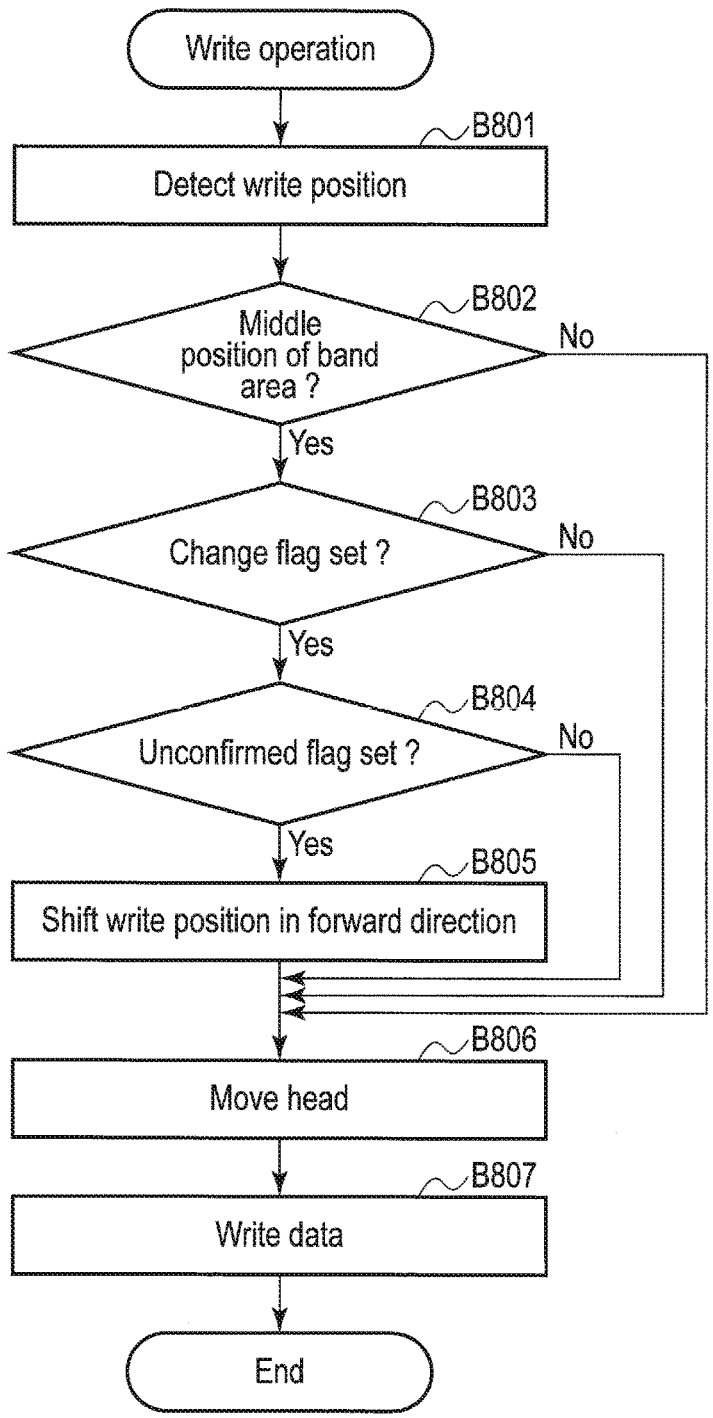
FIG. 8 is a flowchart showing an example of write operation of the magnetic disk device according to the embodiment.

FIG. 8 is a flowchart showing an example of write operation of the magnetic disk device 1 according to the present embodiment.

The MPU 60 detects the sector to which data is written (B801), and determines whether or not the write position to which data is written is a middle position of a band area (B802). When the MPU 60 determines that the write position to which data is written is not a middle position of a band area (No in B802), the MPU 60 proceeds to step B806. When the MPU 60 determines that the write position to which write is written is a middle position of a band area (Yes in B802), the MPU 60 determines whether or not a change flag is set (B803). When the MPU 60 determines that a change flag is not set (No in B803), the MPU 60 proceeds to step B806. When the MPU 60 determines that a change flag is set (Yes in B803), the MPU 60 determines whether or not an unconfirmed flag is set (B804). When the MPU 60 determines that an unconfirmed flag is not set (No in B804), the MPU 60 proceeds to step B806.

When the MPU 60 determines that an unconfirmed flag is set (Yes in B804), the MPU 60 shifts the write position in the forward direction (B805). For example, the MPU 60 shifts the write position by one track pitch multiplied by n (n=1, 2, 3, . . . ) in the forward direction. The MPU 60 moves the head 15 (write head 15W) to the write position obtained by the shift in the forward direction (B806), and writes data in accordance with WDOC based on the current corrected value (B807).

Figure 9:
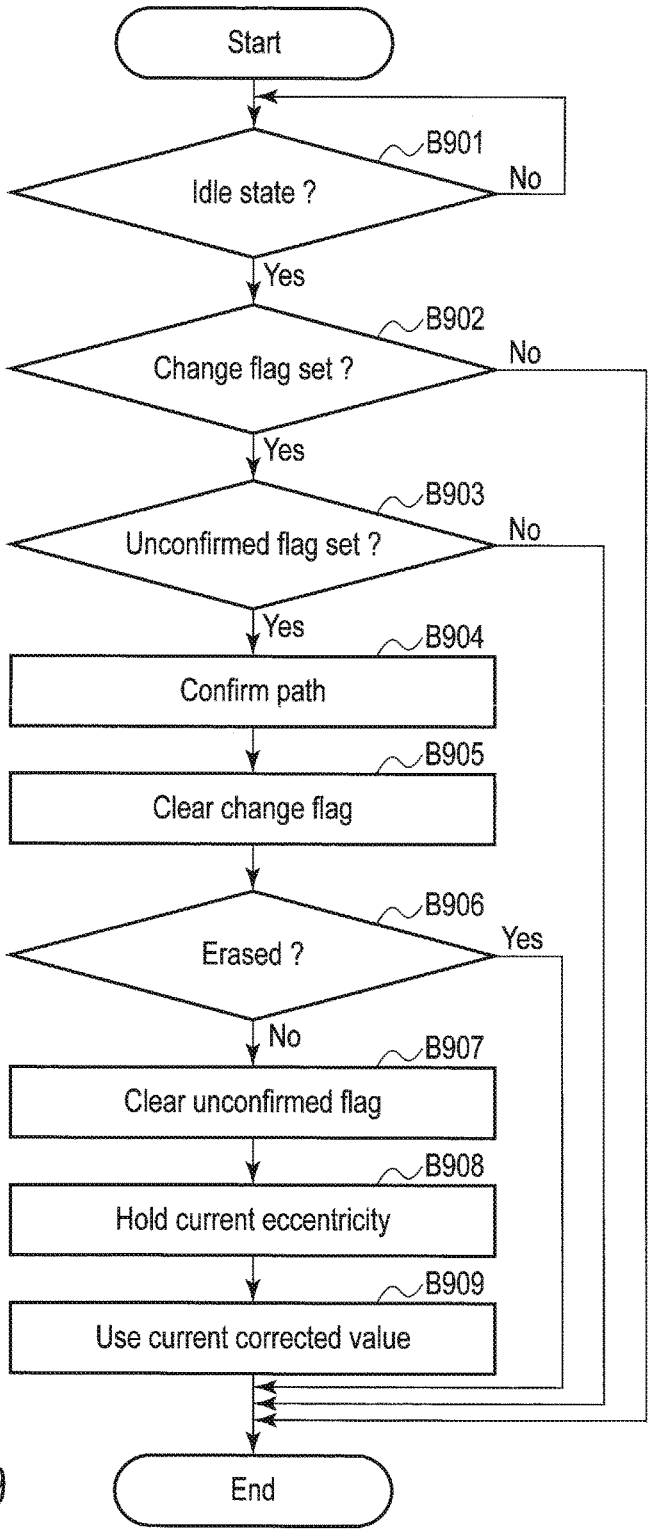
FIG. 9 is a flowchart showing an example of a process for confirming the path of write data according to the embodiment.

FIG. 9 is a flowchart showing an example of a process for confirming the path of write data according to the present embodiment.

The MPU 60 determines whether or not an access from the host is performed in a certain time (B901). In other words, the MPU 60 determines whether or not the current state is an idle state. When the MPU 60 determines that the current state is not an idle state (No in B901), the MPU 60 returns to step B901. When the MPU 60 determines that the current state is an idle state (Yes in B901), the MPU 60 determines whether or not a change flag is set (B902). When the MPU 60 determines that a change flag is not set (No in B902), the MPU 60 terminates the process. When the MPU 60 determines that a change flag is set (Yes in B902), the MPU 60 determines whether or not an unconfirmed flag is set (B903).

When the MPU 60 determines that an unconfirmed flag is not set (No in B903), the MPU 60 terminates the process. When the MPU 60 determines that an unconfirmed flag is set (Yes in B903), the MPU 60 confirms the path of the track written in accordance with WDOC based on the current corrected value (B904). For example, in the test region TR, the MPU 60 writes a write track (previous write track) in accordance with WDOC based on the previous corrected value, and writes the current write track in the forward direction of the previous write track in accordance with WDOC based on the current corrected value. The MPU 60 confirms the path of the current write track by reading the previous read track corresponding to the previous write track.

The MPU 60 clears the change flag (B905), and determines whether or not the adjacent track (previous adjacent track) in a direction opposite to the forward direction is erased (B906). When the MPU 60 determines that the previous adjacent track is erased (Yes in B906), the MPU 60 terminates the process. When the MPU 60 determines that the previous adjacent track is not erased (No in B906), the MPU 60 clears the unconfirmed flag (B907). The MPU 60 holds the current eccentricity in the disk 10 and a memory, for example, the nonvolatile memory 80 (B908), and sets the current corrected value so as to be used in WDOC (B909). In other words, the MPU 60 writes data in accordance with WDOC based on the current corrected value without shifting the write position in the forward direction when the write process is restarted from a middle position of a band area. After setting the current corrected value so as to be used in WDOC (B909), the MPU 60 terminates the process.

In the present embodiment, the magnetic disk device 1 measures the current eccentricity and compares the previous eccentricity with the current eccentricity when a write process is restarted from a middle position of a track in a band area. When the previous eccentricity is different from the current eccentricity, the magnetic disk device 1 calculates the current corrected value based on the current eccentricity, and changes the corrected value to be used in WDOC from the previous corrected value to the current corrected value. The magnetic disk device 1 restarts the write process from a shift position away from the sector in which the write process is restarted by a certain distant, for example, by one track pitch, in the forward direction. Thus, when a write process is interrupted, and further when the eccentricity of the disk 10 is even changed, the magnetic disk device 1 is capable of reducing the effect on the write performance and performing a write process without erasing the previous adjacent write track. In this manner, it is possible to provide a magnetic disk device with improved reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk;
a head which writes data to the disk and reads data from the disk; and
a controller which calculates a first corrected value based on a first eccentricity of the disk, writes a first track to a first target position based on the first corrected value, and writes a second track so as to overlap the first track to a second target position a first distance away from the first target position in a first direction according to a radial direction based on the first corrected value, wherein
when the controller interrupts the process for writing the second track so as to overlap the first track at a first position of the second track, and restarts the process for writing the second track from the first position, the controller measures a second eccentricity of the disk, and compares the first eccentricity with the second eccentricity, and
when the first eccentricity is different from the second eccentricity, the controller restarts the process for writing the second track from a second position a second distance away from the first position in the first direction.

2. The magnetic disk device of claim 1, wherein
when the controller restarts the process for writing the second track, the controller calculates a second corrected value based on the second eccentricity, and restarts the process for writing the second track based on the second corrected value from the second position.

3. The magnetic disk device of claim 2, wherein
when the controller confirms that the first eccentricity is different from the second eccentricity, the controller sets a first flag indicating that the first corrected value is changed to the second corrected value.

4. The magnetic disk device of claim 3, wherein
when the controller confirms that the first eccentricity is different from the second eccentricity, the controller sets a second flag indicating that a path of a third track written to a third target position is not confirmed, based on the second corrected value.

5. The magnetic disk device of claim 4, wherein
when the controller detects that the first flag and the second flag are set, the controller restarts the process for writing the second track from the second position.

6. The magnetic disk device of claim 5, wherein
when the controller detects that the first flag and the second flag are set, the controller writes a fourth track to a fourth target position based on the first corrected value, writes, based on the second corrected value, the third track so as to overlap the fourth track to the third target position the first distance away from the fourth target position in the first direction, and confirms a path of the third track by reading a second area different from a first area of the fourth track overlapping the third track.

7. The magnetic disk device of claim 6, wherein
the controller clears the first flag and the second flag when the controller succeeds in reading the second area.

8. The magnetic disk device of claim 7, wherein
the controller restarts the process for writing the second track from the first position based on the second corrected value when the controller clears the first flag and the second flag.

9. The magnetic disk device of claim 1, wherein
the second distance is equal to the first distance.

10. The magnetic disk device of claim 1, wherein
when the first eccentricity is equal to the second eccentricity, the controller calculates a second corrected value based on the second eccentricity, and restarts the process for writing the second track from the first position based on the second corrected value.

11. A write method applied to a magnetic disk device, the magnetic disk device comprising a disk and a head which writes data to the disk and reads data from the disk, the method comprising:
calculating a first corrected value based on a first eccentricity of the disk;
writing a first track to a first target position based on the first corrected value;
writing a second track so as to overlap the first track to a second target position a first distance away from the first target position in a first direction according to a radial direction based on the first corrected value;
interrupts the writing the second track so as to overlap the first track at a first position of the second track;
measuring, when the writing the second track is restarted from the first position, a second eccentricity of the disk, and comparing the first eccentricity with the second eccentricity; and
restarting, when the first eccentricity is different from the second eccentricity, the writing the second track from a second position a second distance away from the first position in the first direction.

12. The method of claim 11, further comprising:
calculating a second corrected value based on the second eccentricity when the writing the second track is restarted; and
restarting the writing the second track based on the second corrected value from the second position.

13. The method of claim 12, further comprising
setting a first flag indicating that the first corrected value is changed to the second corrected value when it is confirmed that the first eccentricity is different from the second eccentricity.

14. The method of claim 13, further comprising
setting a second flag indicating that a path of a third track written to a third target position is not confirmed, based on the second corrected value, when it is confirmed that the first eccentricity is different from the second eccentricity.

15. The method of claim 14, further comprising
restarting the writing the second track from the second position when the set first flag and the set second flag are detected.

16. The method of claim 15, further comprising:
writing a fourth track to a fourth target position based on the first corrected value when the set first flag and the set second flag are detected;
writing, based on the second corrected value, the third track so as to overlap the fourth track to the third target position the first distance away from the fourth target position in the first direction; and
confirming a path of the third track by reading a second area different from a first area of the fourth track overlapping the third track.

17. The method of claim 16, further comprising
clearing the first flag and the second flag when the second area is successfully read.

18. The method of claim 17, further comprising
restarting the writing the second track from the first position based on the second corrected value when the first flag and the second flag are cleared.

19. The method of claim 11, wherein
the second distance is equal to the first distance.

20. The method of claim 11, further comprising:
calculating a second corrected value based on the second eccentricity when the first eccentricity is equal to the second eccentricity; and
restarting the writing the second track from the first position based on the second corrected value.

* * * * *